United States Patent
Nagamine et al.

(10) Patent No.: US 12,489,142 B2
(45) Date of Patent: Dec. 2, 2025

(54) POSITIVE ELECTRODE MATERIAL AND BATTERY

(71) Applicant: Panasonic Intellectual Property Management Co., Ltd., Osaka (JP)

(72) Inventors: Kenta Nagamine, Osaka (JP); Izuru Sasaki, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 560 days.

(21) Appl. No.: 18/046,505

(22) Filed: Oct. 14, 2022

(65) Prior Publication Data
US 2023/0066483 A1     Mar. 2, 2023

Related U.S. Application Data

(63) Continuation of application No. PCT/JP2021/016252, filed on Apr. 22, 2021.

(30) Foreign Application Priority Data

Apr. 28, 2020   (JP) .................................. 2020-079597

(51) Int. Cl.
| | |
|---|---|
| *H01M 10/0562* | (2010.01) |
| *H01M 4/485* | (2010.01) |
| *H01M 10/0525* | (2010.01) |
| *H01M 4/02* | (2006.01) |

(52) U.S. Cl.
CPC ....... *H01M 10/0562* (2013.01); *H01M 4/485* (2013.01); *H01M 10/0525* (2013.01); *H01M 2004/028* (2013.01); *H01M 2300/008* (2013.01)

(58) Field of Classification Search
CPC ............. H01M 4/485; H01M 10/0525; H01M 10/0562; H01M 2004/028; H01M 2300/008
USPC .................................................. 429/322, 323
See application file for complete search history.

(56) References Cited

U.S. PATENT DOCUMENTS

| | | | |
|---|---|---|---|
| 2009/0081554 | A1 | 3/2009 | Takada et al. |
| 2017/0077502 | A1 | 3/2017 | Kishimoto et al. |
| 2020/0350623 | A1 | 11/2020 | Sasaki et al. |

FOREIGN PATENT DOCUMENTS

| | | |
|---|---|---|
| CN | 106068573 A | 11/2016 |
| WO | 2007/004590 | 1/2007 |
| WO | 2019/146216 A1 | 8/2019 |

OTHER PUBLICATIONS

Machine translation of CN 106068573 A (Year: 2016).*

(Continued)

*Primary Examiner* — Kevin P Kerns
(74) *Attorney, Agent, or Firm* — Rimon P.C.

(57) ABSTRACT

The positive electrode material according to an aspect of the present disclosure includes a first solid electrolyte, a positive electrode active material, and a coating material coating the surface of the positive electrode active material. The first solid electrolyte is represented by the following compositional formula: $Li_aM_bO_cX_d$. In the compositional formula, a, b, c, and d are positive real numbers; M is at least one selected from the group consisting of Ta and Nb; and X is at least one selected from the group consisting of Cl, Br, and I.

12 Claims, 3 Drawing Sheets

(56) References Cited

OTHER PUBLICATIONS

The EPC Office Action dated Sep. 20, 2023 for the related European Patent Application No. 21797562.2.
Anonymous: "Transition metal—Wikipedia", Jan. 1, 2000 (Jan. 1, 2000), XP093032392, Retrieved from the Internet: URL:https://en.wikipedia.org/wiki/Transition_metal[retrieved on Mar. 16, 2023].
English Translation of Chinese Search Report dated Feb. 27, 2025 for the related Chinese Patent Application No. 202180028524.X.
International Search Report of PCT application No. PCT/JP2021/016252 dated Jul. 20, 2021.
Atsushi Sakuda et al., "Interfacial Observation between $LiCoO_2$ Electrode and $Li_2S$—$P_2S_5$ Solid Electrolytes of All-Solid-State Lithium Secondary Batteries Using Transmission Electron Microscopy", Chemistry of Materials, American Chemical Society, 2010, vol. 22, 3, Sep. 25, 2009, pp. 949-956.

\* cited by examiner

POSITIVE ELECTRODE MATERIAL AND BATTERY

BACKGROUND

1. Technical Field

The present disclosure relates to a positive electrode material and a battery.

2. Description of the Related Art

International Publication No. 2007/004590 discloses an all solid lithium battery that includes a lithium ion conductive solid electrolyte mainly composed of a sulfide and an active material having a surface coated with a lithium ion conductive oxide.

Chemistry of Materials, Am. Chem. Soc., 2010, Vol. 22, 3, 949-956 describes that in a battery using a sulfide solid electrolyte, an interface layer is formed at the interface between the positive electrode material and the sulfide solid electrolyte after initial charging to increase the resistance of the battery.

SUMMARY

One non-limiting and exemplary embodiment provides a positive electrode material that can reduce the resistance of a battery and also can improve the charge and discharge efficiency.

In one general aspect, the techniques disclosed here feature a positive electrode material comprising a first solid electrolyte, a positive electrode active material; and a coating material coating a surface of the positive electrode active material. The first solid electrolyte is represented by the following compositional formula (1): $Li_aM_bO_cX_d$. In the compositional formula (1), a, b, c, and d are positive real numbers; M is at least one selected from the group consisting of Ta and Nb; and X is at least one selected from the group consisting of Cl, Br, and I.

The present disclosure provides a positive electrode material that can reduce the resistance of a battery and also can improve the charge and discharge efficiency.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTIONS

Figure 1:
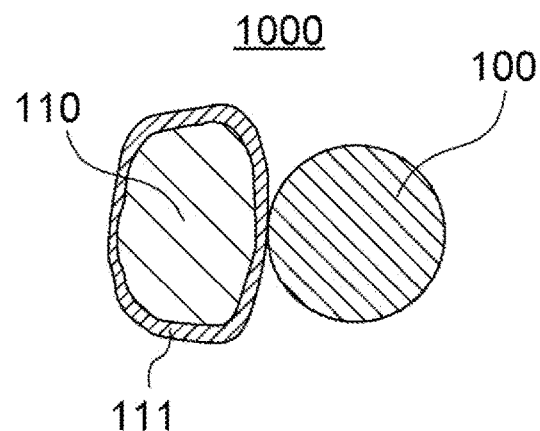
FIG. 1 is a cross-sectional view illustrating a schematic structure of a positive electrode material in Embodiment 1.

Underlying Knowledge Forming Basis of the Present Disclosure

International Publication No. 2007/004590 discloses an all solid lithium battery including a lithium ion conductive solid electrolyte mainly composed of a sulfide and an active material having a surface coated with a lithium ion conductive oxide. The patent literature describes that a use of lithium niobate (i.e., $LiNbO_3$) as a lithium ion conductive oxide particularly prevents of generation of a high-resistance layer between the sulfide solid electrolyte and the positive electrode active material surface to significantly improve the output characteristics.

Chemistry of Materials, Am. Chem. Soc., 2010, Vol. 22, 3, 949-956 describes that a cause of generating a high-resistance layer between a sulfide solid electrolyte and a positive electrode active material surface is interdiffusion between the metal element included in the positive electrode active material and a sulfur element (i.e., S) constituting the solid electrolyte. That is, the generation of a high-resistance layer as above is derived from S as a constitutional element of the solid electrolyte.

According to the knowledge obtained from the inventions described in International Publication No. 2007/004590 and Chemistry of Materials, Am. Chem. Soc., 2010, Vol. 22, 3, 949-956, in the case of a battery using a sulfide as the solid electrolyte, if the contact between the active material and the solid electrolyte is not sufficiently suppressed by coating the surface of the active material by, for example, a coating material such as a lithium ion conductive oxide, since the resistance at the interface of the active material and the solid electrolyte is increased to increase the polarization, it becomes practically difficult to operate as a battery. In contrast, in the case of a battery using a solid electrolyte not containing S, operation as a battery is possible even if the surface of the active material is not coated with a lithium ion conductive oxide.

However, the present inventors have diligently studied and, as a result, found that even when a solid electrolyte not including S is used as the solid electrolyte included in a positive electrode material, the resistance of a battery is reduced by coating the surface of the active material with a coating material. Although the reasons thereof are not clear, it is inferred that various factors, such as the oxidation resistance of the coating material, the oxidation resistance of the lithium ion conductive solid electrolyte used as the solid electrolyte of the battery, the reactivity between the coating material and the active material, the reactivity between the coating material and the solid electrolyte, and the physical contact between the active material and the solid electrolyte, are multiply involved.

For example, when the lithium ion conductive solid electrolyte used as the solid electrolyte of a battery is a halide, oxidation of the halogen included in the solid electrolyte is induced by rising of the potential of the positive electrode during the charging process of the battery. Such oxidation of a halogen causes decomposition of the solid electrolyte. Furthermore, since a halogen gas is generated by the oxidation reaction, a gap is generated at the contact interface between the active material and the solid electrolyte, resulting in a decrease in the effective reaction area. Consequently, the resistance of the battery is increased. It is inferred that the solid electrolyte is prevented from being in contact with the high-potential active material by the coating material coating the surface of the active material lies between the active material and the solid electrolyte to suppress the oxidation of the halogen. It is inferred that the resistance of a battery can be reduced for these reasons.

By the above findings, the present inventors arrived at the following positive electrode materials of the present disclosure that can reduce the resistance of a battery.

Outline of an Aspect According to the Present Disclosure

A positive electrode material according to a 1st aspect of the present disclosure includes:
- a first solid electrolyte;
- a positive electrode active material; and
- a coating material coating a surface of the positive electrode active material.

Here, the first solid electrolyte is represented by the following compositional formula (1): $Li_aM_bO_cX_d$.

In the compositional formula (1),
- a, b, c, and d are positive real numbers;
- M is at least one selected from the group consisting of Ta and Nb; and
- X is at least one selected from the group consisting of Cl, Br, and I.

The positive electrode material according to the 1st aspect includes the coating material that lies between the positive electrode active material and the first solid electrolyte of a halide solid electrolyte. This coating material suppresses the transfer of electrons to the halide solid electrolyte even when the potential of the positive electrode rises during the charging process of the battery. Consequently, since an oxidation reaction of the halogen in the halide solid electrolyte is suppressed, decomposition of the first solid electrolyte is suppressed, and generation of a halogen gas is also suppressed. As a result, degradation of the first solid electrolyte is suppressed, and a decrease in the effective reaction area between the positive electrode active material and the first solid electrolyte is also suppressed. For these reasons, the positive electrode material according to the 1st aspect can reduce the resistance of a battery. Furthermore, consequently, the positive electrode material according to the 1st aspect can improve the charge and discharge efficiency of a battery.

According to a 2nd aspect of the present disclosure, for example, in the positive electrode material according to the 1st aspect, the coating material may include O.

The positive electrode material according to the 2nd aspect can more effectively reduce the resistance of a battery and also can improve the charge and discharge efficiency.

According to a 3rd aspect of the present disclosure, for example, in the positive electrode material according to the 1st or 2nd aspect, the coating material may include F.

The positive electrode material according to the 3rd aspect can more effectively reduce the resistance of a battery.

According to a 4th aspect of the present disclosure, for example, in the positive electrode material according to any one of the 1st to 3rd aspects, the coating material may include at least one selected from the group consisting of B, N, P, S, and Si.

The coating material including at least one selected from the group consisting of B, N, P, S, and Si can form a coating with low electron conductivity on the surface of the positive electrode active material. Consequently, the positive electrode material according to the 4th aspect can further reduce the oxidation reaction of the first solid electrolyte. The elements such as B, N, P, S, and Si form strong covalent bonds with oxygen. Accordingly, the electrons in the coating material are delocalized to reduce the electron conductivity of the coating made of the coating material. Accordingly, even when the thickness of the coating material on the surface of the positive electrode active material is thin, transfer of electrons between the positive electrode active material and the first solid electrolyte can be blocked to more effectively suppress the oxidation reaction of the first solid electrolyte. Accordingly, the positive electrode material according to the 4th aspect can more effectively reduce the resistance of a battery and also can improve the charge and discharge efficiency.

According to a 5th aspect of the present disclosure, for example, in the positive electrode material according to any one of the 1st to 4th aspects, the coating material may include an oxoacid salt of a non-metal or metalloid cation.

The positive electrode material according to the 5th aspect can more effectively reduce the resistance of a battery.

According to a 6th aspect of the present disclosure, for example, in the positive electrode material according to any one of the 1st to 5th aspects, the coating material may include a glass-forming oxide.

The positive electrode material according to the 6th aspect can enhance the lithium ion conductivity in the coating material. Specifically, it is inferred that since the coating material is partially amorphized by including a lithium compound of an oxide called glass-forming oxide, such as phosphoric acid or silicic acid, to broaden the ion conductive path, the lithium ion conductivity in the coating material can be enhanced. Consequently, the positive electrode material according to the 6th aspect can more effectively reduce the resistance of a battery.

According to a 7th aspect of the present disclosure, for example, in the positive electrode material according to any one of the 1st to 6th aspects, the coating material may include an intermediate oxide.

The positive electrode material according to the 7th aspect can enhance the lithium ion conductivity in the coating material. Specifically, it is inferred that since the coating material is partially amorphized by including a lithium compound of an oxide called intermediate oxide such as niobic acid to broaden the ion conductive path, the lithium ion conductivity in the coating material can be enhanced. Consequently, the positive electrode material according to the 6th aspect can more effectively reduce the resistance of a battery.

According to an 8th aspect of the present disclosure, for example, in the positive electrode material according to any one of the 1st to 7th aspects, the coating material may include Li.

The positive electrode material according to the 8th aspect can increase the carrier concentration, i.e., the Li concentration, at the interface between the positive electrode active material and the first solid electrolyte. Accordingly, the positive electrode material according to the 8th aspect can more effectively reduce the resistance of a battery.

According to a 9th aspect of the present disclosure, for example, in the positive electrode material according to any one of the 1st to 8th aspects, the coating material may include at least one selected from the group consisting of lithium phosphate, lithium niobate, lithium fluorosulfonate, and lithium bis(fluorosulfonyl)imide.

Lithium phosphate and lithium niobate can enhance the lithium ion conductivity of the coating material. Lithium fluorosulfonate and lithium bis(fluorosulfonyl)imide can form a good interface, i.e., an interface with low resistance, between the positive electrode active material and the first solid electrolyte. Consequently, the positive electrode material according to the 9th aspect can more effectively reduce the resistance of a battery.

According to a 10th aspect of the present disclosure, for example, in the positive electrode material according to any one of the 1st to 9th aspects, the X may include Cl.

The positive electrode material according to the 10th aspect can further improve the ion conductivity of the first solid electrolyte. Consequently, the positive electrode material according to the 10th aspect can further improve the charge and discharge efficiency of a battery.

According to an 11th aspect of the present disclosure, for example, in the positive electrode material according to any one of the 1st to 10th aspects, the positive electrode active material may include a lithium-containing transition metal oxide.

The positive electrode material according to the 11th aspect can increase the energy density of a battery.

The battery according to a 12th aspect of the present disclosure includes:
a positive electrode including the positive electrode material according to any one of the 1st to 11th aspects;
a negative electrode; and
an electrolyte layer disposed between the positive electrode and the negative electrode.

The battery according to the 12th aspect can decrease the resistance and also can improve the charge and discharge efficiency.

According to a 13th aspect of the present disclosure, for example, in the battery according to the 12th aspect, the electrolyte layer may include a sulfide solid electrolyte.

The battery according to the 13th aspect can decrease the resistance and also can improve the charge and discharge efficiency.

Embodiments of the present disclosure will now be described with reference to the drawings.

Embodiment 1

FIG. 1 is a cross-sectional view illustrating a schematic structure of a positive electrode material 1000 in Embodiment 1. The positive electrode material 1000 in Embodiment 1 includes a first solid electrolyte 100, a positive electrode active material 110, and a coating material 111 coating a surface of the positive electrode active material 110. As shown in FIG. 1, the first solid electrolyte 100 and the positive electrode active material 110 may be in the form of particles. Incidentally, the coating material 111 may coat the entire surface of the positive electrode active material 110 or may partially coat the surface of the positive electrode active material 110. That is, the coating material 111 may at least partially coat the surface of the positive electrode active material 110. In other words, the positive electrode active material 110 and the first solid electrolyte 100 have a portion where they are isolated from each other by the coating material 111 and are not in contact with each other. The positive electrode active material 110 and the first solid electrolyte 100 may have a portion where they are in contact with each other.

The first solid electrolyte 100 is represented by the following compositional formula (1): $Li_aM_bO_cX_d$.

In the compositional formula (1), a, b, c, and d are positive real numbers. M is at least one selected from the group consisting of Ta and Nb. X is at least one selected from the group consisting of Cl, Br, and I.

In the positive electrode material 1000 in the present Embodiment, the coating material 111 lies between the positive electrode active material 110 and the first solid electrolyte 100 of a halide solid electrolyte. This coating material 111 suppresses the transfer of electrons to the halide solid electrolyte even when the potential of the positive electrode rises during the charging process of the battery. Consequently, since an oxidation reaction of the halogen in the first solid electrolyte 100 is suppressed, decomposition of the first solid electrolyte 100 is suppressed, and generation of a halogen gas caused by the oxidation reaction is also suppressed. As a result, degradation of the first solid electrolyte 100 is suppressed, and a decrease in the effective reaction area between the positive electrode active material 110 and the first solid electrolyte 100 is also suppressed. For these reasons, positive electrode material 1000 according to the present embodiment can reduce the resistance of a battery. Furthermore, consequently, the positive electrode material 1000 according to the present embodiment can improve the charge and discharge efficiency of the battery.

As described above, the coating material 111 may evenly coat the entire surface of the positive electrode active material 110. Consequently, direct contact between the positive electrode active material 110 and the first solid electrolyte 100 is suppressed, and the oxidation reaction of the first solid electrolyte 100 can be more reliably suppressed. Consequently, it is possible to further enhance the charge and discharge characteristics of a battery and to suppress an increase in the reaction overpotential of the battery.

Alternatively, the coating material 111 may coat a part of the surface of the positive electrode active material 110. A plurality of particles of the positive electrode active material 110 are in direct contact with each other through the portion not coated with the coating material 111 to improve the electron conductivity between particles of the positive electrode active material 110. Consequently, operation of a battery at high output is possible.

As the coating material 111, for example, a material with low electron conductivity can be used. As the coating material 111, for example, a material containing O can be used. For example, examples of the material containing O include oxide materials or oxide solid electrolytes.

Examples of the oxide material that can be used for the coating material 111 include $SiO_2$, $Al_2O_3$, $TiO_2$, $B_2O_3$, $Nb_2O_5$, $WO_3$, and $ZrO_2$. Examples of the oxide solid electrolyte that can be used for the coating material 111 include Li—P—O compounds such as $Li_3PO_4$, Li—Nb—O compounds such as $LiNbO_3$, Li—B—O compounds such as $LiBO_2$ and $Li_3BO_3$, Li—Al—O compounds such as $LiAlO_2$, Li—Si—O compounds such as $Li_4SiO_4$, Li—Ti—O compounds such as $Li_2SO_4$ and $Li_4Ti_5O_{12}$, Li—Zr—O compounds such as $Li_2ZrO_3$, Li—Mo—O compounds such as $Li_2MoO_3$, Li—V—O compounds such as $LiV_2O_5$, and Li—W—O compounds such as $Li_2WO_4$.

The coating material 111 may include an oxide solid electrolyte. The oxide solid electrolyte has high ion conductivity and high high-potential stability. Consequently, the charge and discharge efficiency can be further improved by using an oxide solid electrolyte.

The coating material 111 may include an oxoacid salt. The coating material 111 including an oxoacid salt can more effectively reduce the resistance of a battery. The oxoacid salt may be an oxoacid salt of a non-metal or metalloid cation. The "metalloid element" is B, Si, Ge, As, Sb, or Te as described above. The "non-metal element" is N, P, S, Cl, Br, or I. That is, these elements are an element group that bind to oxygen to generate oxo acid.

The coating material 111 may include at least one selected from the group consisting of B, N, P, S, and Si.

The coating material 111 including at least one selected from the group consisting of B, N, P, S, and Si can form a coating with low electron conductivity on the surface of the positive electrode active material 100. Consequently, the positive electrode material 1000 in Embodiment 1 can further reduce the oxidation reaction of the first solid electrolyte 100. In addition, the elements such as B, N, P, S, and Si form strong covalent bonds with oxygen. Accordingly, the electrons in the coating material 111 are delocalized to reduce the electron conductivity of the coating made of the coating material 111. Accordingly, even when the thickness of the coating material 111 on the surface of the positive electrode active material 110 is thin, transfer of electrons between the positive electrode active material 111 and the first solid electrolyte 100 can be blocked to more effectively suppress the oxidation reaction of the first solid electrolyte 100. Accordingly, when the coating material 111 includes at least one selected from the group consisting of B, N, P, S, and Si, the positive electrode material 1000 can more effectively reduce the resistance of a battery and also can improve the charge and discharge efficiency.

The coating material 111 may include Li. According to this composition, since the carrier concentration at the interface between the positive electrode active material 110 and the first solid electrolyte 100 can be increased, the resistance of a battery can be more effectively reduced.

When the coating material 111 includes Li, the molar ratio of lithium to other cations, molar ratio Li/(other cations), in the coating material 111 may be 0.2 or more and 3.6 or less or 0.2 or more and 3.0 or less. When the molar ratio, Li/(other cations), is 0.2 or more and 3.6 or less, the lithium ion conductivity in the coating material 111 can be enhanced.

The coating material 111 may include a glass-forming oxide such as phosphoric acid or silicic acid. Here, the glass-forming oxide means a network-forming oxide that can form glass by itself. The element becoming a cation that can form a glass-forming oxide, i.e., an element called network-former, is, for example, Si, P, B, Ge, or V. The coating material 111 including a glass-forming oxide can enhance the lithium ion conductivity in the coating material 111. Specifically, when the coating material 111 includes a lithium compound of an oxide called glass-forming oxide, such as phosphoric acid or silicic acid, the coating is partially amorphized to broaden the ion conductive path. Consequently, the lithium ion conductivity in the coating material 111 can be enhanced, and the resistance of a battery can be more effectively reduced.

The coating material 111 may include an intermediate oxide such as niobic acid. Here, the intermediate oxide means an oxide that cannot form glass by itself (that is, cannot form a network of glass by itself) but can form glass or enter the network of glass depending on the composition. The element becoming a cation that can form an intermediate oxide is, for example, Nb, Ti, Zn, Al, or Zr. The coating material 111 including an intermediate oxide can enhance the lithium ion conductivity in the coating material 111. Specifically, when the coating material 111 includes a lithium compound of an oxide called intermediate oxide, such as niobic acid, the coating is partially amorphized to broaden the ion conductive path. Consequently, the lithium ion conductivity in the coating material 111 can be enhanced, and the resistance of a battery can be more effectively reduced.

The coating material 111 may include at least one selected from the group consisting of lithium phosphate, lithium niobate, lithium fluorosulfonate, and lithium bis(fluorosulfonyl)imide.

Lithium phosphate and lithium niobate can enhance the lithium ion conductivity of the coating material 111. Lithium fluorosulfonate and lithium bis(fluorosulfonyl)imide can form a good interface, i.e., an interface with low resistance, between the positive electrode active material 110 and the first solid electrolyte 100. Consequently, the positive electrode material 1000 according to the present embodiment can more effectively reduce the resistance of a battery.

The coating material 111 may include at least one selected from the group consisting of lithium phosphate, lithium niobate, lithium fluorosulfonate, and lithium bis(fluorosulfonyl)imide as a main component and may further include inevitable impurities or the starting material that is used when the coating material 111 is formed, a by-product, a decomposition product, etc. That is, the coating material 111 may include lithium phosphate, lithium niobate, lithium fluorosulfonate, and lithium bis(fluorosulfonyl)imide such that the total mass proportion with respect to the whole coating material 111 is, for example, 50% or more (50 mass % or more). The coating material 111 may include lithium phosphate, lithium niobate, lithium fluorosulfonate, and lithium bis(fluorosulfonyl)imide such that the total mass proportion with respect to the whole coating material 111 excluding impurities inevitably mixed is, for example, 100% (100 mass %).

Incidentally, in Embodiment 1, the coating material 111 may be $LiNbO_3$. $LiNbO_3$ has higher ion conductivity and higher high-potential stability. Accordingly, the charge and discharge efficiency of a battery can be further improved by using $LiNbO_3$.

In the state in which the positive electrode active material 110 and the first solid electrolyte 100 are in direct contact with each other, electrons are extracted from the first solid electrolyte 100 when the potential of the positive electrode rises when charging the battery to cause oxidation of the first solid electrolyte 100. In order to prevent it, it is effective that the coating material 111 lies between the positive electrode active material 110 and the first solid electrolyte 100. However, the coating material 111 may block the electronic contact between the positive electrode active material 110 and a conductive assistant or between the positive electrode active materials 110. In such a case, the electronic path from the current collector of a battery to each particle of the positive electrode active material 110 is discontinued, and the isolated positive electrode active material 110 does not contribute to the charging and discharging reaction in some cases. That is, since the apparent amount of the active material decreases and the reaction area decreases, it is difficult to sufficiently reduce the resistance. In contrast, it is possible to both suppress the oxidation reaction of the first solid electrolyte 100 and secure the electron path by exposing a part of the surface of the positive electrode active material 110 without coating with the coating material 111. Accordingly, a part of the surface of the positive electrode active material 110 may be exposed without being coated with the coating material 111.

In order to more effectively reduce the resistance of a battery by further suppressing the oxidation reaction of the first solid electrolyte 100, the coverage rate, which is the proportion of the coated surface area of the positive electrode active material 110 coated with the coating material 111 to the whole surface area of the positive electrode active material 110, may be 47% or more. In order to more effectively reduce the resistance of a battery, the coating rate may be 60% or more or may be 100%.

The coverage rate can be determined by separating peaks of O1s in X-ray photoelectron spectroscopy (XPS). For example, when Li(Ni,Co,Mn)O$_2$ is used as the positive electrode active material 110 and lithium phosphate is used as the coating material 111, the coverage rate may be determined by dividing the area of O1s peak derived from the positive electrode active material having the peak top at around 529 eV by the area obtained by subtracting the O1s peak derived from carbonic acid appearing at around 531 eV from the O1s peak appearing at around 532 eV.

If it is difficult to correctly determine the coverage rate by the above method, as an alternative method, the coverage rate may be determined from the ratio of the content of metal elements, such as Ni, Co, and Mn, in the active material 110 and the content of cations, such as P or Si, in the coating material 111 measured by XPS.

The coating material 111 may include an oxoacid salt. The coating material 111 including an oxoacid salt can more effectively reduce the resistance of a battery. The oxoacid salt may be an oxoacid salt of a non-metal or metalloid cation. The "metalloid element" is B, Si, Ge, As, Sb, or Te as described above. The "non-metal element" is N, P, S, Cl, Br, or I. That is, these elements are an element group that bind to oxygen to generate oxo acid.

The mass proportion of the coating material 111 to the positive electrode active material 110 may be 2.0 mass % or less or may be 1.1 mass % or less. According to this composition, since the proportion of the active material 110 or the first solid electrolyte 100 in the positive electrode can be increased, the energy density of a battery can be increased.

The mass proportion of the coating material 111 to the positive electrode active material 110 may be 0.1 mass % or more or may be 0.2 mass % or more. According to this composition, since a side reaction of the active material 110 and the first solid electrolyte 100 can be effectively suppressed, the resistance of a battery can be more effectively reduced.

The mass proportion of the coating material 111 to the positive electrode active material 110 may be determined by, for example, dissolving the positive electrode with an acid or the like to form an aqueous solution and then quantitatively measuring the included elements by inductively coupled plasma (ICP) emission spectrochemical analysis. On this occasion, the mass proportion may be determined from the quantitative values of elements that are included in either one of the positive electrode active material 110 and the coating material 111 by presuming a stoichiometric composition. For example, when LiNiO$_2$ is coated with Li$_3$PO$_4$, the mass proportion of the coating material 111 may be determined from the quantitative values of Ni and P by assuming that LiNiO$_2$ and Li$_3$PO$_4$ are present in the stoichiometric compositions.

In the compositional formula (1), X may include Cl. According to this composition, the ion conductivity of the first solid electrolyte 100 can be further improved. Consequently, the charge and discharge efficiency of a battery can be further improved.

The positive electrode active material 110 is, for example, a material that has a property of occluding and releasing metal ions (e.g., lithium ions). Examples of the positive electrode active material include a lithium-containing transition metal oxide, a transition metal fluoride, a polyanion material, a fluorinated polyanion material, a transition metal sulfide, a transition metal oxysulfide, and a transition metal oxynitride. Examples of the lithium-containing transition metal oxide include Li(Ni, Co, Al)O$_2$, Li(Ni,Co,Mn) O$_2$, and LiCoO$_2$. For example, when a lithium-containing transition metal oxide is used as the positive electrode active material, the manufacturing cost of the positive electrode can be reduced, and the average discharge voltage can be increased.

In order to increase the energy density of a battery, the positive electrode active material 110 may be lithium nickel-cobalt manganate. For example, the positive electrode active material 110 may be Li(Ni,Co,Mn)O$_2$.

According to the composition above, the energy density and charge and discharge efficiency of a battery can be further enhanced.

The thickness of the coating material 111 may be 1 nm or more and may be 100 nm or less.

The coating material 111 having a thickness of 1 nm or more can prevent the direct contact between the positive electrode active material 110 and the first solid electrolyte 100 and can suppress the side reaction of the first solid electrolyte. Accordingly, the charge and discharge efficiency can be improved.

When the thickness of the coating material 111 is 100 nm or less, the thickness of the coating material 111 does not become too thick. Accordingly, the internal resistance of a battery can be sufficiently reduced. As a result, the energy density of the battery can be increased.

The thickness of the coating material 111 may be 2 nm or more and 40 nm or less.

The coating material 111 having a thickness of 2 nm or more can further prevent the direct contact between the positive electrode active material 110 and the first solid electrolyte 100 and can suppress the side reaction of the first solid electrolyte 100. Accordingly, the charge and discharge efficiency can be further improved.

In addition, when the thickness of the coating material 111 is 40 nm or less, the internal resistance of a battery can be further reduced. As a result, the energy density of the battery can be increased.

The method for measuring the thickness of the coating material 111 is not particularly limited. For example, the thickness can be determined by directly observing the thickness of the coating material 111 using a transmission electron microscope or the like. The thickness can also be determined from a change in the spectrum derived from the active material measured by XPS while removing the coating layer by Ar sputtering.

The shape of the first solid electrolyte 100 in Embodiment 1 is not particularly limited and may be, for example, needle-like, spherical, or elliptical spherical. For example, the shape of the first solid electrolyte 100 may be in the form of particles.

For example, when the shape of the first solid electrolyte 100 in Embodiment 1 is in the form of particles (e.g., spherical), the median diameter may be 100 μm or less. When the median diameter is 100 μm or less, the positive electrode active material 110 and the first solid electrolyte 100 are in a good dispersion state in the positive electrode material 1000, and thereby the charge and discharge characteristics are improved. In Embodiment 1, the median diameter may be 10 μm or less.

According to the configuration above, the positive electrode active material 110 and the first solid electrolyte 100 can form a good dispersion state in the positive electrode material 1000.

In addition, in Embodiment 1, the first solid electrolyte 100 may be smaller than the median diameter of the positive electrode active material 110.

According to the configuration above, the first solid electrolyte 100 and the positive electrode active material 110 can form a better dispersion state in an electrode.

The median diameter of the positive electrode active material 110 may be 0.1 μm or more and may be 100 μm or less.

When the median diameter of the positive electrode active material 110 is 0.1 μm or more, the positive electrode active material 110 and the first solid electrolyte 100 form a good dispersion state in the positive electrode material 1000, and thereby the charge and discharge characteristics of a battery are improved. When the median diameter of the positive electrode active material 110 is 100 μm or less, since diffusion of lithium in the positive electrode active material 110 is fast, the operation of a battery at high output is more easy.

The median diameter of the positive electrode active material 110 may be larger than that of the first solid electrolyte 100. Consequently, the positive electrode active material 110 and the first solid electrolyte 100 can form a good dispersion state.

The median diameter means the particle diameter when the cumulative volume in the volume-based particle size distribution is equal to 50%. The volume-based particle size distribution is measured with, for example, a laser diffraction measurement device or an image analysis device.

Incidentally, in the positive electrode material 1000 in Embodiment 1, the first solid electrolyte 100 and the coating material 111 may be in contact with each other as shown in FIG. 1.

The positive electrode material 1000 in Embodiment 1 may include a plurality of first solid electrolytes 100 in the form of particles and a plurality of positive electrode active materials 110 in the form of particles.

In the positive electrode material 1000 in Embodiment 1, the content of the first solid electrolyte 100 and the content of the positive electrode active material 110 may be the same as or different from each other.

Method for Manufacturing First Solid Electrolyte

The first solid electrolyte in Embodiment 1 can be manufactured by, for example, the following method.

Raw material powders are prepared so as to give the blending ratio of a desired composition and are mixed. Examples of the raw material powder include an oxide, a hydroxide, a halide, and acid halide. For example, when a solid electrolyte composed of Li, Ta, O, and Cl is produced, LiOH and $TaCl_5$ are prepared at a molar ratio of 1:1.

On this occasion, "M" in the above-mentioned compositional formula (1) can be determined by selecting the types of the raw material powders. The values "a", "b", "c", and "d" can be adjusted by adjusting the raw materials, blending ratio, and synthesis process.

The raw material powders are well mixed and are then mixed, pulverized, and reacted with each other by a mechanochemical method. Alternatively, the raw material powders are well mixed and then may be sintered in vacuum.

Consequently, a first solid electrolyte is obtained.

Method for Manufacturing Positive Electrode Active Material Coated with Coating Material The positive electrode active material 110 coated with the coating material 111 can be manufactured by the following method.

First, a powder for the positive electrode active material 110 is prepared. The powder for the positive electrode active material 110 is produced by, for example, a coprecipitation method. In the coprecipitation method, a precursor made of a metal oxide is produced, and the precursor is heat-treated together with a lithium source to produce the positive electrode active material 110. There are commercial products of powders for the positive electrode active material 110 of various compositions, and they are readily available.

Subsequently, a coating material 111 is formed on the surfaces of particles of the positive electrode active material 110. The method for forming the coating material 111 is not particularly limited. Examples of the method for forming the coating material 111 include a liquid phase coating method and a gas phase coating method.

For example, in the liquid phase coating method, a precursor solution of the coating material 111 is applied to the surface of the positive electrode active material 110. When a coating material 111 including lithium phosphate is formed, the precursor solution can be a mixed solution of a solvent, lithium hydroxide, and triethyl phosphate.

Incidentally, the raw material is not limited as long as it is dissolved or dispersed in a solvent. Examples of the lithium source include alkyl lithium, such as tert-butyl lithium; lithium alkoxides, such as lithium methoxide, lithium ethoxide, lithium isopropoxide, and lithium tert-butoxide; and lithium iodide, lithium bromide, lithium chloride, lithium carbonate, lithium nitrate, lithium sulfate, and metallic lithium. Examples of the phosphoric acid source include trimethyl phosphate, tripropyl phosphate, tributyl phosphate, phosphoric acid, ammonium dihydrogen phosphate, diammonium hydrogen phosphate, and triammonium phosphate. A raw material including phosphoric acid and lithium may be used.

The solvent is, for example, alcohol such as ethanol. However, the solvent is not limited as long as it can dissolve or disperse the raw material, and various solvents can be selected depending on the raw material. Examples of the solvent include methanol, propanol, isopropanol, butanol, dimethyl carbonate, diethyl carbonate, ethyl methyl carbonate, dimethyl sulfoxide, tetrahydrofuran, hexane, benzene, toluene, methylene chloride, acetone, and acetonitrile.

The amounts of lithium hydroxide and triethyl phosphate are adjusted according to the target composition of the coating material 111. According to the need, water may be added to a precursor solution. The precursor solution may be acidic or alkaline.

Embodiment 2

Embodiment 2 will now be described. The description overlapping with that of Embodiment 1 will be appropriately omitted.

Figure 2:
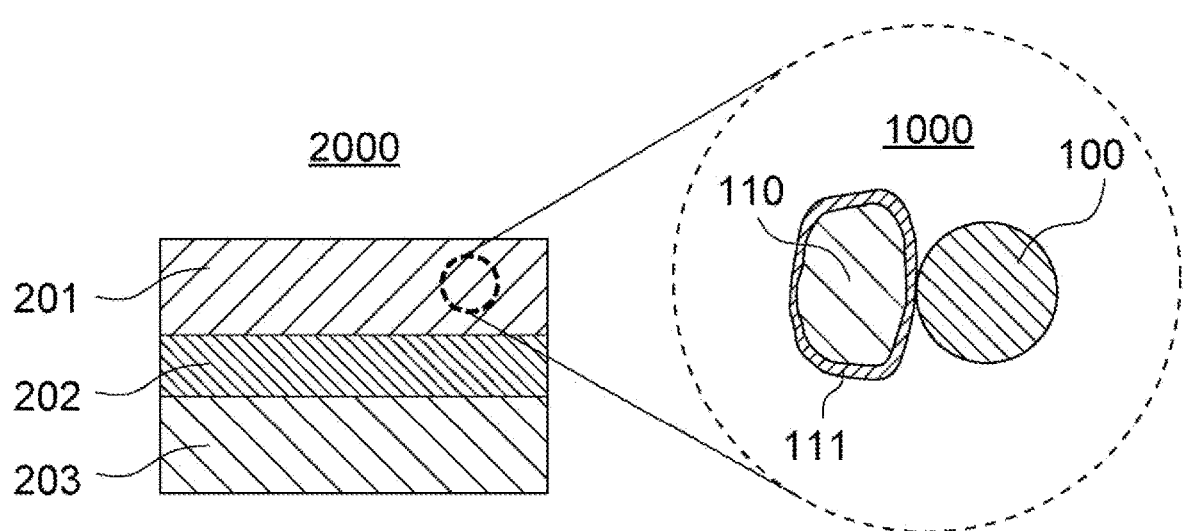
FIG. 2 is a cross-sectional view illustrating a schematic structure of a battery in Embodiment 2.

FIG. 2 is a cross-sectional view illustrating a schematic structure of a battery 2000 in Embodiment 2.

The battery 2000 in Embodiment 2 includes a positive electrode 201, an electrolyte layer 202, and a negative electrode 203.

The positive electrode 201 includes the positive electrode material 1000 in Embodiment 1.

The electrolyte layer 202 is disposed between the positive electrode 201 and the negative electrode 203.

According to the configuration above, the charge and discharge efficiency of the battery 2000 can be improved.

The volume ratio of the positive electrode active material 110 and the first solid electrolyte 100 included in the positive electrode 201, "v1:100−v1", may satisfy $30 \leq v1 \leq 95$. Here, v1 represents the volume ratio of the positive electrode active material 110 when the total volume of the positive electrode active material 110 and the first solid electrolyte 100 included in the positive electrode 201 is defined as 100. When $30 \leq v1$ is satisfied, a sufficient energy density of the battery 2000 is likely to be secured. When v1≤ 95 is satisfied, the operation of the battery 2000 at high output is more easy.

The thickness of the positive electrode 201 may be 10 μm or more and 500 μm or less. Incidentally, when the thickness of the positive electrode 201 is 10 μm or more, a sufficient energy density of the battery 2000 is likely to be secured. Incidentally, when the thickness of the positive electrode 201 is 500 μm or less, the operation of the battery 2000 at high output is more easy.

The electrolyte layer 202 is disposed between the positive electrode 201 and the negative electrode 203.

The electrolyte layer 202 is a layer including an electrolyte material. The electrolyte material is, for example, a solid electrolyte (i.e., a second solid electrolyte). That is, the electrolyte layer 202 may be a solid electrolyte layer.

As the second solid electrolyte included in the electrolyte layer 202, the first solid electrolyte described in Embodiment 1 above is mentioned. That is, the electrolyte layer 202 may include the first solid electrolyte described in Embodiment 1 above.

According to the composition above, the charge and discharge efficiency of the battery 2000 can be further improved.

The second solid electrolyte included in the electrolyte layer 202 may be a halide solid electrolyte that is different form the first solid electrolyte described in Embodiment 1 above. That is, the electrolyte layer 202 may include a halide solid electrolyte that is different form the first solid electrolyte described in Embodiment 1 above.

According to the composition above, the output density and charge and discharge efficiency of the battery 2000 can be improved.

The halide solid electrolyte included in the electrolyte layer 202 may include Y as a metallic element.

According to the composition above, the output density and charge and discharge efficiency of the battery 2000 can be further improved.

As the second solid electrolyte included in the electrolyte layer 202, a sulfide solid electrolyte may be used. That is, the electrolyte layer 202 may include a sulfide solid electrolyte.

According to the composition above, since a sulfide solid electrolyte having excellent reduction stability is included, a low-potential negative electrode material, such as graphite or metallic lithium, can be used, and the energy density of the battery 2000 can be improved.

Examples of the sulfide solid electrolyte include $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$. In addition, for example, $LiX2$, $Li_2O$, $M2Oq$, $LipM2Oq$, or the like may be added to these sulfide solid electrolytes. Here, X2 is one or more elements selected from the group consisting of F, Cl, Br, and I. M2 is any of P, Si, Ge, B, Al, Ga, In, Fe, and Zn. p and q are each independently a natural number.

As the second solid electrolyte included in the electrolyte layer 202, an oxide solid electrolyte, a polymer solid electrolyte, or a complex hydride solid electrolyte may be used.

As the oxide solid electrolyte, for example, a NASICON-type solid electrolyte represented by $LiTi_2(PO_4)_3$ and its element substitution products, a $(LaLi)TiO_3$-based perovskite-type solid electrolyte, an LISICON-type solid electrolyte represented by $Li_{14}ZnGe_4O_{16}$, $Li_4SiO_4$, $LiGeO_4$ and their element substitution products, a garnet-type solid electrolyte represented by $Li_7La_3Zr_2O_{12}$ and its element substitution products, $Li_3N$ and its H substitution products, $Li_3PO_4$ and its N substitution products, or glass or glass-ceramic in which $Li_2SO_4$, $Li_2CO_3$, or the like is added to the base material of an Li—B—O compound, such as $LiBO_2$ or $Li_3BO_3$, can be used.

As the polymer solid electrolyte, for example, a compound of a polymer compound and a lithium salt can be used. The polymer compound may have an ethylene dioxide structure. The polymer compound having an ethylene dioxide structure can contain a large amount of a lithium salt and can further enhance the ion conductivity. As the lithium salt, for example, $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, or $LiC(SO_2CF_3)_3$ can be used. As the lithium salt, one lithium salt selected from these lithium salts can be used alone. Alternatively, as the lithium salt, a mixture of two or more lithium salts selected from these lithium salts can be used.

As the complex hydride solid electrolyte, for example, $LiBH_4$—LiI or $LiBH_4$—$P_2S_5$ can be used.

Incidentally, the electrolyte layer 202 may include the second solid electrolyte as a main component. That is, the electrolyte layer 202 may include the second solid electrolyte at a mass proportion of, for example, 50% or more (50 mass % or more) with respect to the whole electrolyte layer 202.

According to the composition above, the charge and discharge characteristics of the battery 2000 can be further improved.

The electrolyte layer 202 may include the second solid electrolyte at a mass proportion of, for example, 70% or more (70 mass % or more) with respect to the whole electrolyte layer 202.

According to the composition above, the charge and discharge characteristics of the battery 2000 can be further improved.

Incidentally, the electrolyte layer 202 may include the second solid electrolyte as a main component and may further include inevitable impurities or the starting material that is used when the second solid electrolyte is synthesized, a by-product, a decomposition product, etc.

The electrolyte layer 202 may include the second solid electrolyte, for example, at a mass proportion of 100% (100 mass %) with respect to the whole electrolyte layer 202 excluding impurities inevitably mixed.

According to the composition above, the charge and discharge characteristics of the battery 2000 can be further improved.

As described above, the electrolyte layer 202 may be composed of the second solid electrolyte only.

Incidentally, the electrolyte layer 202 may include two or more materials mentioned as the second solid electrolyte. For example, the solid electrolyte layer may include a halide solid electrolyte and a sulfide solid electrolyte.

The thickness of the electrolyte layer 202 may be 1 μm or more and 300 μm or less. When the thickness of the electrolyte layer 202 is 1 μm or more, the positive electrode 201 and the negative electrode 203 are unlikely to short circuit. When the thickness of the electrolyte layer 202 is 300 μm or less, high-output operation is easy. That is, the battery 2000 can secure sufficient safety and can be operated at high output by appropriately adjusting the thickness of the electrolyte layer 202.

The negative electrode 203 includes a material that has a property of occluding and releasing metal ions (e.g., lithium ions). The negative electrode 203 includes, for example, a negative electrode active material.

As the negative electrode active material, for example, a metal material, a carbon material, an oxide, a nitride, a tin compound, or a silicon compound can be used. The metal material may be a single metal. Alternatively, the metal material may be an alloy. Examples of the metal material include lithium metals and lithium alloys. Examples of the carbon material include natural graphite, coke, carbon under graphitization, carbon fibers, spherical carbon, artificial graphite, and amorphous carbon. From the viewpoint of capacity density, silicon (Si), tin (Sn), a silicon compound, or a tin compound can be suitably used as the negative electrode active material.

The negative electrode 203 may include a third solid electrolyte. According to the composition above, the lithium ion conductivity in the negative electrode can be enhanced, and operation at high output is possible. As the third solid electrolyte included in the negative electrode 203, the materials mentioned as the examples of the second solid electrolyte of the electrolyte layer 202 can be used.

The median diameter of the negative electrode active material particles may be 0.1 μm or more and 100 μm or less. When the median diameter of the negative electrode active material particles is 0.1 μm or more, the negative electrode active material particles and the third solid electrolyte can form a good dispersion state in the negative electrode 203, and thereby the charge and discharge characteristics of the battery 2000 are improved. When the median diameter of the negative electrode active material particles is 100 μm or less, diffusion of lithium in the negative electrode active material particles is fast. Consequently, the operation of a battery at high output is more easy.

The median diameter of the negative electrode active material particles may be larger than that of the third solid electrolyte. Consequently, the negative electrode active material particles and the solid electrolyte can form a good dispersion state.

The volume ratio of the negative electrode active material particles and the solid electrolyte included in the negative electrode 203, "v2:100−v2", may satisfy 30≤v2≤95. When 30≤v2 is satisfied, a sufficient energy density of the battery 2000 is likely to be secured. When v2≤95 is satisfied, the operation of the battery 2000 at high output is more easy.

The thickness of the negative electrode 203 may be 10 μm or more and 500 μm or less. When the thickness of the negative electrode 203 is 10 μm or more, a sufficient energy density of the battery 2000 is easily secured. When the thickness of the negative electrode 203 is 500 μm or less, the operation of the battery 2000 at high output is more easy.

At least one selected from the group consisting of the positive electrode 201, the electrolyte layer 202, and the negative electrode 203 may include a binder for the purpose of improving the adhesion between particles. The binder is used for improving the adhesion of the material constituting the electrode and the electrolyte layer. Examples of the binder include polyvinylidene fluoride, polytetrafluoroethylene, polyethylene, polypropylene, aramid resin, polyamide, polyimide, polyamideimide, polyacrylonitrile, polyacrylic acid, polyacrylic acid methyl ester, polyacrylic acid ethyl ester, polyacrylic acid hexyl ester, polymethacrylic acid, polymethacrylic acid methyl ester, polymethacrylic acid ethyl ester, polymethacrylic acid hexyl ester, polyvinyl acetate, polyvinyl pyrrolidone, polyether, polyether sulfone, hexafluoropolypropylene, styrene-butadiene-rubber, and carboxymethylcellulose. In addition, as the binder, a copolymer of two or more materials selected from tetrafluoroethylene, hexafluoroethylene, hexafluoropropylene, perfluoroalkylvinylether, vinylidene fluoride, chlorotrifluoroethylene, ethylene, propylene, pentafluoropropylene, fluoromethylvinylether, acrylic acid, and hexadiene can be used. Moreover, a mixture of two or more materials selected from these materials may be used as the binder.

At least one of the positive electrode 201 and the negative electrode 203 may include a conductive assistant for the purpose of enhancing the electron conductivity. As the conductive assistant, for example, graphite such as natural graphite or artificial graphite, carbon black such as acetylene black or Ketjen black, a conductive fiber such as a carbon fiber or a metal fiber, a metal powder such as fluorinated carbon or aluminum, a conductive whisker such as zinc oxide or potassium titanate, a conductive metal oxide such as titanium oxide, or a conductive polymer compound such as polyaniline, polypyrrole, or polythiophene can be used. In the case of using a carbon conductive assistant, it is possible to reduce the cost.

Incidentally, the battery 2000 in Embodiment 2 can be configured as batteries of various shapes, such as a coin type, a cylindrical type, a square type, a sheet type, a button type, a flat type, and a laminated type.

The battery 2000 in Embodiment 2 may be manufactured by, for example, preparing the positive electrode material 1000 in Embodiment 1, an electrolyte layer-forming material, and a negative electrode-forming material and producing a stack of a positive electrode, an electrolyte layer, and a negative electrode disposed in this order by a known method.

EXAMPLES

The present disclosure will now be described in more detail with reference to Examples and Comparative Examples.

Example 1

Production of Positive Electrode Active Material Having Surface Coated with Coating Material Lithium hydroxide (9.5 mg) and triethyl phosphate (24.0 mg) were dissolved in an appropriate amount of super-dehydrated ethanol (manufactured by FUJIFILM Wako Pure Chemical Corporation) in an argon glove box under an argon atmosphere of a dew point of −60° C. or less to produce a coating material solution. In the coating material solution, the molar ratio of lithium and phosphorus was 3:1.

As a positive electrode active material, 2 g of Li(Ni,Co,Mn)O$_2$ (hereinafter, referred to as NCM) was prepared in an agate mortar, and the coating material solution produced above was then gradually added thereto with stirring.

After the coating material solution was completely added, stirring was continued until dryness could be visually observed.

The powder after the dryness was put in an alumina crucible and heat-treated in an oxygen atmosphere at 400° C. for 3 hours.

The powder obtained after the heat treatment was pulverized in an agate mortar again to obtain a positive electrode active material of Example 1 having a surface coated with a coating material. The coating material was lithium phosphate (Li$_3$PO$_4$).

Production of Sulfide Solid Electrolyte

LiOH and TaCl$_5$ were weighed as raw material powders at a molar ratio, LiOH:TaCl$_5$, of 1:1 in a dry atmosphere of a dew point of −30° C. or less. These raw material powders were pulverized and mixed in a mortar to obtain a powder mixture. The resulting powder mixture was subjected to milling treatment using a planetary ball mill (manufactured by Fritsch, P-7 type) at 600 rpm for 24 hours. Subsequently, the powder mixture was heat-treated at 200° C. for 6 hours. As in above, a powder of the solid electrolyte of Example 1 composed of Li, Ta, O, and Cl was obtained.

As in above, a powder of the first solid electrolyte of Example 1 composed of Li, Ta, O, and Cl was obtained. Hereinafter, the solid electrolyte of Example 1 composed of Li, Ta, O, and Cl is referred to as "LTOC". The composition of the resulting first solid electrolyte of Example 1 was measured by ICP emission spectral analysis for Li and Ta, ion chromatography for Cl, and inert gas fusion-infrared absorption analysis for O. The apparatuses used for measuring the composition were an ICP emission spectrophotometer ("iCAP7400" (manufactured by Thermo Fisher Scientific, Inc.)), an ion chromatographic apparatus ("ICS-3000" (manufactured by Thermo Fisher Scientific, Inc.)), and an oxygen analyzer ("EMGA-920" (manufactured by HORIBA, Lt.)). In the first solid electrolyte of Example 1, the molar ratio, Li/Ta, was 1.20, and the molar ratio, O/Cl, was 0.35.

Production of Second Solid Electrolyte

LiCl, $YCl_3$, and $YBr_3$ were prepared as raw material powders at a molar ratio, $LiCl:YCl_3:YBr_3$, of 3.000:0.333:0.666 in an argon atmosphere of a dew point of −60° C. or less. They were pulverized and mixed in a mortar. Subsequently, the resulting mixture of the raw material powders was heat-treated in an argon atmosphere using an electric furnace at 500° C. for 3 hours. The resulting material was pulverized using a pestle and a mortar. As in above, a powder of the second solid electrolyte including Li, Y, Br, and Cl was obtained. Hereinafter, the second solid electrolyte of Example 1 is referred to as "LYBC"

Production of Battery

The positive electrode active material having a surface coated with lithium phosphate, LTOC as the first solid electrolyte, and a vapor-grown carbon fiber (VGCF) as a conductive assistant were prepared at a mass ratio of positive electrode active material:LTOC:VGCF of 77:21:2 in an argon atmosphere of a dew point of −60° C. or less. They were mixed in an agate mortar to produce a positive electrode composite material.

A sulfide solid electrolyte $Li_6PS_5Cl$ (80 mg), an LYBC powder (20 mg), and the above positive electrode composite material (18.2 mg) were stacked in this order in an insulating outer cylinder. A pressure of 720 MPa was applied thereto to obtain a positive electrode and an electrolyte layer.

Subsequently, Li foil was laminated to the electrolyte layer on the opposite side to the side in contact with the positive electrode. A pressure of 80 MPa was applied thereto to produce a stack of the positive electrode, the electrolyte layer, and a negative electrode. The negative electrode was made of the Li foil.

Subsequently, current collectors made of stainless steel were disposed on and under the laminate, and the current collectors were provided with current collector leads. Ultimately, the inside of the insulating outer cylinder was isolated and sealed from the outside atmosphere using an insulating ferrule.

As in above, a battery of Example 1 was produced.

Charge and Discharge Test

The battery of Example 1 was disposed in a thermostatic tank of 25° C. The battery was charged at a constant current value of 0.140 mA, and the charging was stopped at a voltage of 4.3 V. Subsequently, discharging was performed at the same current value of 0.140 mA and was ended at a voltage of 2.5 V. The ratio of the discharging capacity to the charging capacity on this occasion was defined as charge and discharge efficiency. The charge and discharge efficiency of the battery in Example 1 was 96%.

Resistance Measurement

Figure 3:
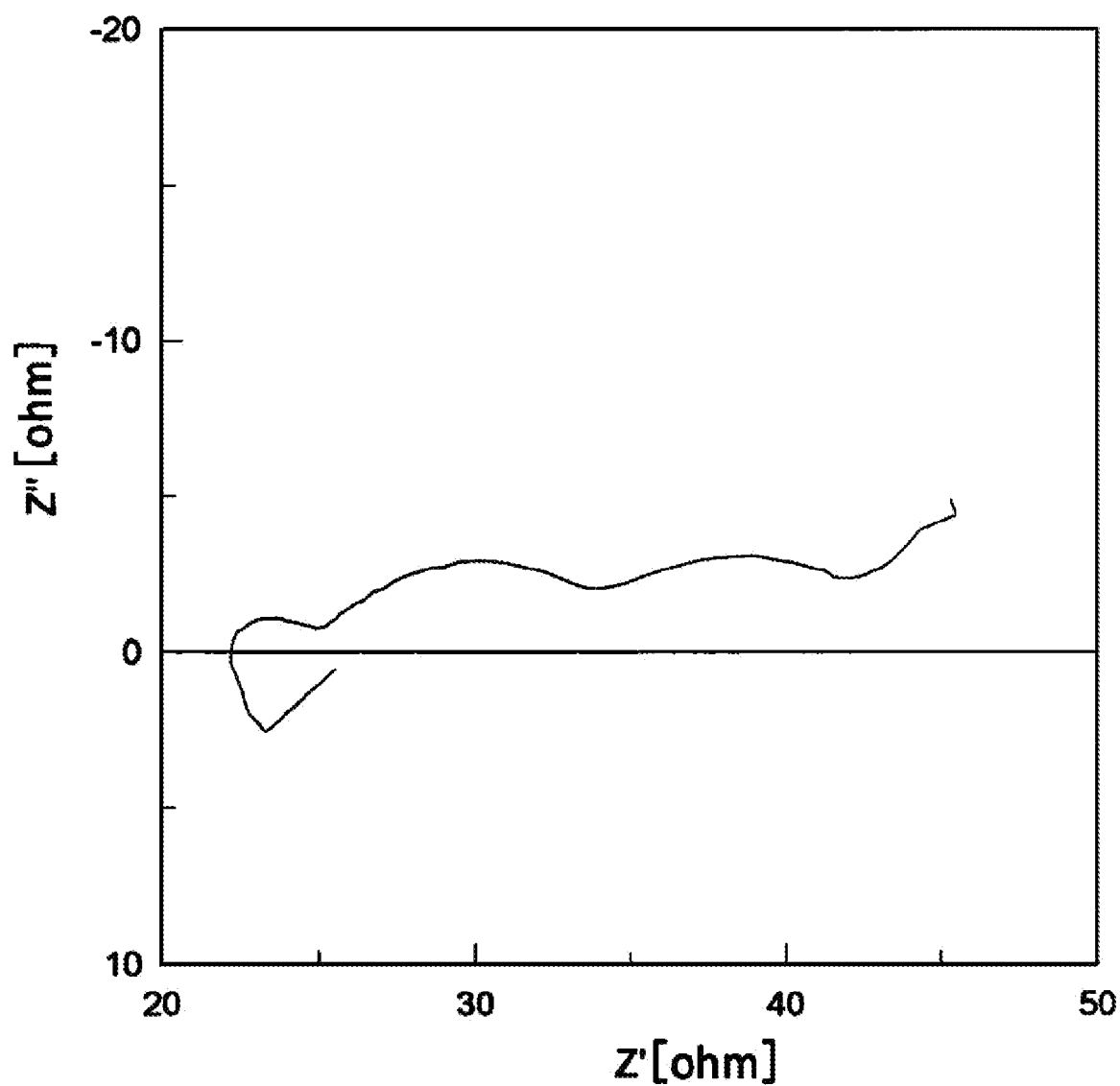
FIG. 3 is a graph showing a Nyquist diagram of a battery in Example 1 at 3.7 V.

FIG. 3 is a graph showing a Nyquist diagram of a battery in Example 1 at 3.7 V. The battery of Example 1 is disposed in a thermostatic tank of 25° C. and was then connected to a potentiostat loaded with a frequency response analyzer. Subsequently, the battery was charged at a constant current value of 0.140 mA, and the charging was stopped when the voltage reached 3.7 V. Subsequently, the frequency dependence of resistance components was evaluated by an alternating current impedance method. On this occasion, the resistance component appearing at around 105 to 102 Hz was isolated by curve fitting as resistance derived from the active material-solid electrolyte interface. The resistance of the battery of Example 1 was estimated to be 7 ohm by this measurement.

Measurement of Coverage Rate

Figure 4A:
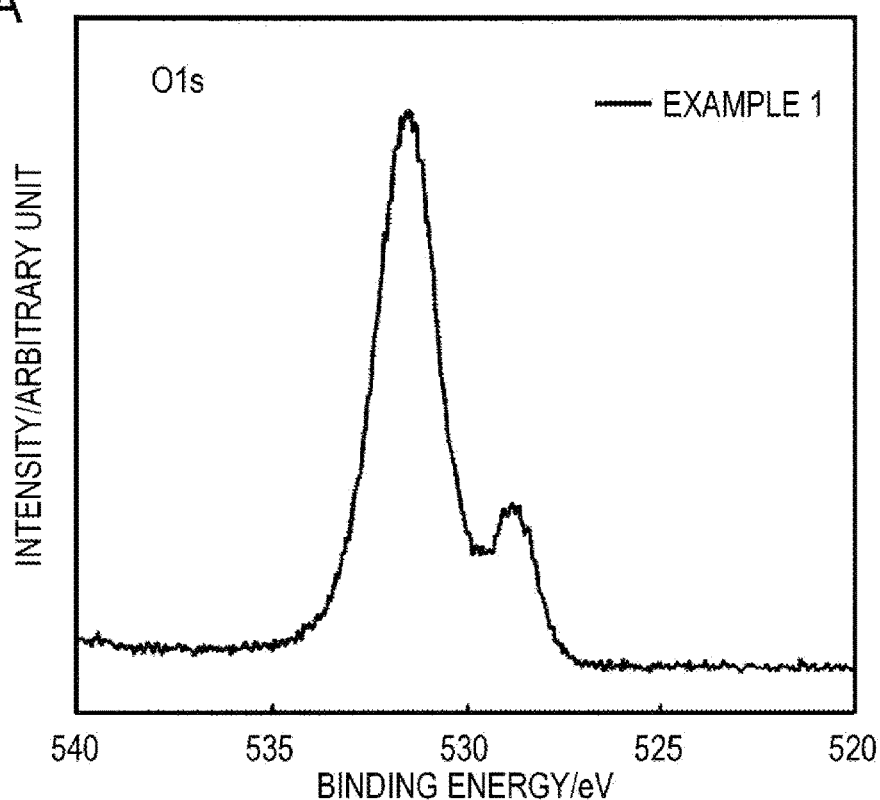
FIG. 4A is a graph showing an O1s spectrum of an active material used in Example 1 measured by X-ray photoelectron spectroscopy.

FIG. 4A is a graph showing an O1s spectrum of an active material used in Example 1 measured by an XPS method. An O1s spectrum of the positive electrode active material surface coated with lithium phosphate was obtained by the XPS method. As the ray source of the XPS, Al-Kα-rays were used.

Figure 4B:
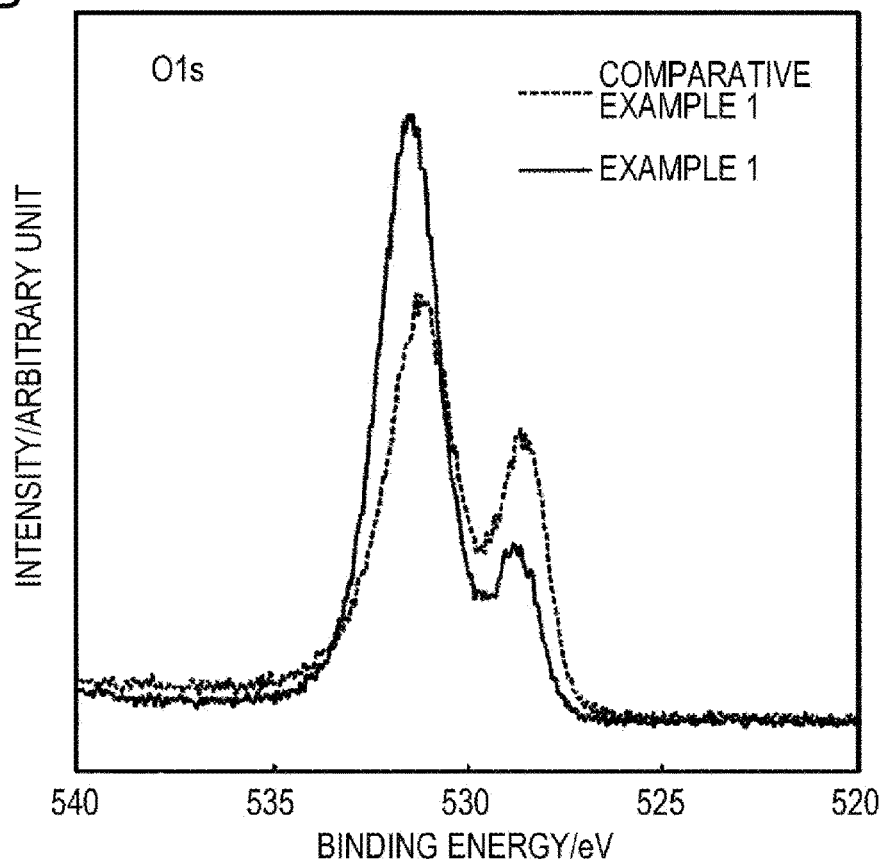
FIG. 4B is a graph showing an O1s spectrum of an active material used in Example 1 measured by X-ray photoelectron spectroscopy and an O1s spectrum of an active material having a surface not coated with a coating material measured by X-ray photoelectron spectroscopy.

A peak with the center at 528 eV and a peak with the center at 532 eV were observed. The peak at 528 eV is a peak derived from M-O (Ni—O, Mn—O, Co—O) in the positive electrode active material. The peak at 532 eV is a peak created by overlapping of the peak of C—O in lithium carbonate, which is an impurity of the surface, and the peak of P—O in lithium phosphate. The influence derived from lithium carbonate was removed by subtracting the peak area at around 532 eV detected for an active material not coated with a coating material and heat-treated in an oxygen atmosphere at 400° C. from the peak area at around 532 eV of the coated active material, and the peak area derived from the coating material was calculated. FIG. 4B is a graph showing an O1s spectrum by the XPS method of the active material used in Example 1 and an O1s spectrum by the XPS method of the active material having a surface not coated with a coating material. The O1s spectrum by the XPS method of the active material having a surface not coated with a coating material shown in FIG. 4B is also a graph showing the spectrum by the XPS method of the O1s of the active material used in Comparative Example 1. Accordingly, in FIG. 4B, it is shown that the O1s spectrum by the XPS method of an active material having a surface not coated with a coating material is the spectrum of the active material used in Comparative Example 1.

The ratio of M-O and P—O in O1s was determined from these peaks to estimate the coverage rate. The coverage rate of lithium phosphate of the active material used in Example 1 was estimated to be 47%.

Example 2

Production of Positive Electrode Active Material with Surface Coated with Coating Material Ethoxylithium (manufactured by Kojundo Chemical Lab. Co., Ltd., 5.95 g) and pentaethoxyniobium (manufactured by Kojundo Chemical Lab. Co., Ltd., 36.43 g) were dissolved in super-dehydrated ethanol (manufactured by FUJIFILM Wako Pure Chemical Corporation, 500 mL) in an argon atmosphere to produce a coating material solution.

In formation of a coating material on the positive electrode active material NCM, a rolling fluidized granulation coating apparatus (manufactured Powrex Corporation, FD-MP-01E) was used. The input of the positive electrode active material, the stirring rotation number, and the solution sending rate of the coating material solution were 1 kg, 400 rpm, and 6.59 g/min, respectively.

The powder after treatment was put in an alumina crucible and taken out under the atmosphere.

Subsequently, heat treatment was performed in the atmosphere at 300° C. for 1 hour.

The powder after the heat treatment was pulverized in an agate mortar again to obtain a positive electrode active material of Example 2 having a surface coated with a coating material. The coating material was lithium niobate ($LiNbO_3$).

Production of Battery

A battery was produced by the same method as in Example 1 except that the positive electrode active material of Example 2 was used.

Charge and Discharge Test

The charge and discharge test of the battery was performed by the same method as in Example 1.

Resistance Measurement

The resistance of the battery was measured by the same method as in Example 1.

Measurement of Coverage Rate

The O1s peak of Nb—O derived from lithium niobate appears at around 530 eV. The coverage rate was determined from the value as in Example 1. The coverage rate of the active material used in Example 2 was about 100%.

Example 3

Production of Positive Electrode Active Material with Surface Coated with Coating Material A lithium bis(fluorosulfonyl)imide ($LiN(SO_2F)_2$) powder (0.2 mg) was dissolved in dimethyl carbonate (19.80 g) in an argon glove box under an argon atmosphere of a dew point of −50° C. or less to produce a 1.0 mass % coating material solution. Hereinafter, lithium bis(fluorosulfonyl)imide is referred to as "LiFSI".

Subsequently, NCM (2 g) as the positive electrode active material was prepared on a polyolefin container, and the produced coating material solution (0.5 g) was then gradually added thereto with stirring. Subsequently, vacuum drying was performed at 100° C. to obtain a positive electrode active material having a surface coated with a coating material of Example 3. The coating material was lithium fluorosulfonate.

Production of Battery

A battery was produced by the same method as in Example 1 except that the positive electrode active material of Example 3 was used.

Charge and Discharge Test

The charge and discharge test of the battery was performed by the same method as in Example 1.

Resistance Measurement

The resistance of the battery was measured by the same method as in Example 1.

Example 4

Production of Positive Electrode Active Material with Surface Coated with Coating Material]

A lithium fluorosulfonate ($LiSO_3F$) powder (0.25 g) was dissolved in dimethyl carbonate (19.75 g) in an argon glove box under an argon atmosphere of a dew point of −50° C. or less to produce a 1.25 mass % coating material solution.

Subsequently, NCM (2 g) as the positive electrode active material was prepared on a polyolefin container, and the produced coating material solution (1.3 g) was then gradually drop-wise added thereto with stirring. Subsequently, vacuum drying was performed at 100° C. to obtain a positive electrode active material having a surface coated with a coating material of Example 4. The coating material was LiFSI.

Production of Battery

A battery was produced by the same method as in Example 1 except that the positive electrode active material of Example 4 was used.

Charge and Discharge Test

The charge and discharge test of the battery was performed by the same method as in Example 1.

Resistance Measurement

The resistance of the battery was measured by the same method as in Example 1.

Comparative Example 1

Preparation of Positive Electrode Active Material

NCM used as the positive electrode active material in Examples 1 to 4 was used as the positive electrode active material of Comparative Example 1 without coating the surface with a coating material.

Production of Battery

A battery was produced by the same method as in Example 1 except that the positive electrode active material of Comparative Example 1 was used.

Charge and Discharge Test

The charge and discharge test of the battery was performed by the same method as in Example 1.

Resistance Measurement

The resistance of the battery was measured by the same method as in Example 1.

Comparative Example 2

Production of Positive Electrode Active Material with Surface Coated with Coating Material A positive electrode active material having a surface coated with a coating material was produced by the same method as in Example 1. That is, NCM having a surface coated with lithium phosphate ($Li_3PO_4$) was used as the positive electrode active material of Comparative Example 2.

Production of Sulfide Solid Electrolyte $Li_2S$ and $P_2S_5$ were weighed at a molar ratio, $Li_2S:P_2S_5$, of 75:25 in an argon glove box under an argon atmosphere of a dew point of −60° C. or less. These powders were pulverized and mixed in a mortar. Subsequently, milling treatment using a planetary ball mill (manufactured by Fritsch, P-7 type) was performed at 510 rpm for 10 hours to obtain a glass-like solid electrolyte. The glass-like solid electrolyte was heat-treated at 270° C. for 2 hours in an inert atmosphere. Consequently, a glass-ceramic-like solid electrolyte, $Li_2S$—$P_2S_5$, was obtained. Hereinafter, $Li_2S$—$P_2S_5$ is referred to as "LPS".

Production of Battery

The positive electrode active material having a surface coated with lithium phosphate as the coating material and LPS as the sulfide solid electrolyte were prepared at a mass ratio, positive electrode active material: LPS of 85:15 in an argon atmosphere of a dew point of −60° C. or less. They were mixed in an agate mortar to produce a positive electrode composite material. After this, a battery was produced as in Example 1.

Charge and Discharge Test

The charge and discharge test of the battery was performed by the same method as in Example 1.

Resistance Measurement

The resistance of the battery was measured by the same method as in Example 1.

Consideration 1

Table 1 shows the coating materials for the positive electrode active materials used in Examples 1 to 4 and Comparative Examples 1 and 2, the solid electrolytes used for the positive electrode materials, the resistance of each battery, and charge and discharge efficiency of each battery.

Comparison of the resistance and the charge and discharge efficiency of the batteries of Examples 1 to 4 and the battery of Comparative Example 1 revealed that when LTOC was used as the solid electrolyte included in the positive electrode material, the resistance of a battery can be reduced and also the charge and discharge efficiency can be improved by coating the surface of the positive electrode active material with a coating material, such as lithium phosphate, lithium niobate, lithium bis(fluorosulfonyl)imide, or lithium fluorosulfonate.

Comparison of the resistance and the charge and discharge efficiency of the battery of Example 1 and the battery of Comparative Example 2 reveals that even if the positive electrode active materials are coated with the same lithium phosphate, the battery of Example 1 using LTOC as the solid electrolyte included in the positive electrode material has more excellent resistance and charge and discharge efficiency.

Example 5

Production of Positive Electrode Active Material with Surface Coated with Coating Material A positive electrode active material having a surface coated with a coating material was produced by the same method as in Example 1. That is, NCM having a surface coated with lithium phosphate ($Li_3PO_4$) was used as the positive electrode active material of Example 5.

Production of First Solid Electrolyte $Li_2O_2$ and $NbCl_5$ were weighed as raw material powders at a molar ratio, $Li_2O_2$:$NbCl_5$, of 1:2 in a dry atmosphere of a dew point of −30° C. or less. They were pulverized and mixed in a mortar to obtain a powder mixture. The resulting powder mixture was subjected to milling treatment using a planetary ball mill (manufactured by Fritsch, P-7 type) at 600 rpm for 24 hours. Subsequently, the powder mixture was heat-treated at 200° C. for 6 hours. Consequently, a powder of a solid electrolyte composed of Li, Nb, O, and Cl was obtained. Hereinafter, the resulting first solid electrolyte of Example 5 composed of Li, Nb, O, and Cl is referred to as "LNOC". In the obtained LNCO, the molar ratio, Li/Nb, was 1.2, and the molar ratio, O/Cl, was 0.35. Incidentally, the composition of the first solid electrolyte of Example 5 was measured by ICP emission spectral analysis for Li and Nb, ion chromatography for Cl, and inert gas fusion-infrared absorption analysis for O. The apparatuses used for measuring the composition were an ICP emission spectrophotometer ("iCAP7400" (manufactured by Thermo Fisher Scientific, Inc.)), an ion chromatographic apparatus ("ICS-3000" (manufactured by Thermo Fisher Scientific, Inc.)), and an oxygen analyzer ("EMGA-920" (manufactured by HORIBA, Lt.)).

Production of Battery

A battery was produced by the same method as in Example 1 except that the positive electrode active material and the first solid electrolyte of Example 5 were used.

Charge and Discharge Test

The charge and discharge test of the battery was performed by the same method as in Example 1. However, the cut-off voltage of discharge, i.e., the voltage at which the discharge is stopped, was set to 3 V.

Resistance Measurement

The resistance of the battery was measured by the same method as in Example 1.

Measurement of Coverage Rate

The coverage rate was measured by the same method as in Example 1. The coverage rate of lithium phosphate of the active material used in Example 5 was estimated to be 47%.

Comparative Example 3

Preparation of Positive Electrode Active Material

NCM used as the positive electrode active material in Example 5 was used as the positive electrode active material of Comparative Example 3 without coating the surface with a coating material.

Production of Battery

A battery was produced by the same method as in Example 5 except that the positive electrode active material of Comparative Example 3 was used.

Charge and Discharge Test

The charge and discharge test of the battery was performed by the same method as in Example 5.

Resistance Measurement

The resistance of the battery was measured by the same method as in Example 5.

Consideration 2

Table 1 shows the coating materials for the positive electrode active materials used in Example 5 and Comparative Example 3, the solid electrolytes used for the positive electrode materials, the resistance of each battery, and charge and discharge efficiency of each battery.

In the batteries of Example 5 and Comparative Example 3, as the solid electrolytes included in the positive electrode materials, the same LNOC was used. As a result, it was confirmed that even when LNOC was used as the solid electrolyte, the resistance of a battery is reduced and also the charge and discharge deficiency of the battery is improved by coating the positive electrode active material with a coating material. This result reveals that effects of reducing the resistance of a battery and also of improving the charge and discharge efficiency are obtained by coating the surface of a positive electrode active material with a coating material regardless of metal species constituting the solid electrolyte.

TABLE 1

| | Coating material | First solid electrolyte | Resistance of battery [ohm] | Charge and discharge efficiency [%] |
|---|---|---|---|---|
| Example 1 | Li—P—O | LTOC | 7 | 96 |
| Example 2 | Li—Nb—O | LTOC | 15 | 96 |
| Example 3 | Li—N—S—O—F | LTOC | 3 | 96 |
| Example 4 | Li—S—O—F | LTOC | 4 | 96 |
| Example 5 | Li—P—O | LNOC | 33 | 95 |

TABLE 1-continued

| | Coating material | First solid electrolyte | Resistance of battery [ohm] | Charge and discharge efficiency [%] |
|---|---|---|---|---|
| Comparative Example 1 | — | LTOC | 27 | 94 |
| Comparative Example 2 | Li—P—O | LPS | 53 | 87 |
| Comparative Example 3 | — | LNOC | 38 | 93 |

The battery of the present disclosure can be used, for example, as an all solid lithium secondary battery.

What is claimed is:

1. A positive electrode material comprising:
a first solid electrolyte;
a positive electrode active material; and
a coating material coating a surface of the positive electrode active material, wherein
the first solid electrolyte is represented by a following compositional formula (1):

$$Li_a M_b O_c X_d,$$

in the compositional formula:
a, b, c, and d are positive real numbers;
M is at least one selected from the group consisting of Ta and Nb; and
X is at least one selected from the group consisting of Cl, Br, and I, and
the coating material includes at least one selected from the group consisting of lithium phosphate, lithium fluorosulfonate, and lithium bis(fluorosulfonyl)imide.

2. The positive electrode material according to claim 1, wherein the coating material includes F.

3. The positive electrode material according to claim 1, wherein
the coating material includes at least one selected from the group consisting of B, N, P, S, and Si.

4. The positive electrode material according to claim 1, wherein
the coating material includes an oxoacid salt of a non-metal or metalloid cation.

5. The positive electrode material according to claim 1, wherein
the coating material includes a glass-forming oxide.

6. The positive electrode material according to claim 1, wherein
the coating material includes an intermediate oxide.

7. The positive electrode material according to claim 1, wherein the X includes Cl.

8. The positive electrode material according to claim 1, wherein
the positive electrode active material includes a lithium-containing transition metal oxide.

9. The positive electrode material according to claim 1, wherein X is I.

10. The positive electrode material according to claim 1, wherein X is I and at least one of Cl and Br.

11. A battery comprising:
a positive electrode including the positive electrode material according to claim 1;
a negative electrode; and
an electrolyte layer disposed between the positive electrode and the negative electrode.

12. The battery according to claim 11, wherein the electrolyte layer includes a sulfide solid electrolyte.

* * * * *